United States Patent
Wu et al.

(10) Patent No.: US 11,775,125 B2
(45) Date of Patent: Oct. 3, 2023

(54) TOUCH ELECTRODE STRUCTURE, TOUCH SCREEN AND TOUCH DISPLAY DEVICE

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Zhongshan Wu, Beijing (CN); Jiandong Guo, Beijing (CN); Yan Liu, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

(*) Notice: Subject to any disclaimer, the term of this patent is extended or adjusted under 35 U.S.C. 154(b) by 169 days.

(21) Appl. No.: 16/765,992

(22) PCT Filed: Jul. 26, 2019

(86) PCT No.: PCT/CN2019/098012
§ 371 (c)(1),
(2) Date: May 21, 2020

(87) PCT Pub. No.: WO2021/016762
PCT Pub. Date: Feb. 4, 2021

(65) Prior Publication Data
US 2021/0405823 A1    Dec. 30, 2021

(51) Int. Cl.
*G06F 3/041*    (2006.01)
*G06F 3/044*    (2006.01)

(52) U.S. Cl.
CPC .......... *G06F 3/0448* (2019.05); *G06F 3/0412* (2013.01)

(58) Field of Classification Search
CPC ............................ G06F 3/0412; G06F 3/0488
See application file for complete search history.

(56) References Cited

U.S. PATENT DOCUMENTS 9,194,901 B2    11/2015  Herman
2011/0210935 A1*  9/2011  Chuang ................. G06F 3/0445
                                                    345/174
(Continued)

FOREIGN PATENT DOCUMENTS

CN    103164091 A    6/2013
CN    103309500 A    9/2013
(Continued)

OTHER PUBLICATIONS

Extended European Serach Report from European Patent Application No. PCT/CN2019098012 dated Jun. 28, 2022.

*Primary Examiner* — Ryan A Lubit
(74) *Attorney, Agent, or Firm* — Dilworth & Barrese, LLP; Michael J. Musella, Esq.

(57) ABSTRACT

A touch electrode structure, a touch screen and a touch display device. The touch electrode structure includes: a plurality of touch electrode blocks electrically insulated from each other, wherein each of the plurality of touch electrode blocks includes a main body portion and a sawtooth portion electrically connected to the main body portion, and the sawtooth portions opposite to each other in adjacent touch electrode blocks are nested with each other.

18 Claims, 14 Drawing Sheets

(56) References Cited

U.S. PATENT DOCUMENTS

| | | | |
|---|---|---|---|
| 2012/0194468 A1* | 8/2012 | Yeh | G06F 3/044 345/174 |
| 2013/0141369 A1* | 6/2013 | Huang | G06F 3/0448 345/173 |
| 2013/0234738 A1* | 9/2013 | Herman | G06F 3/0448 324/686 |
| 2014/0168536 A1 | 6/2014 | Guo et al. | |
| 2014/0291008 A1* | 10/2014 | Huang | H05K 1/0296 174/268 |
| 2016/0274715 A1* | 9/2016 | Wang | G09G 3/3648 |
| 2017/0010714 A1* | 1/2017 | Lee | G06F 3/0448 |
| 2017/0090622 A1* | 3/2017 | Badaye | G06F 3/0448 |
| 2017/0228063 A1 | 8/2017 | Wang et al. | |
| 2018/0173062 A1 | 6/2018 | Li et al. | |
| 2018/0188852 A1* | 7/2018 | Choi | G06F 3/0446 |
| 2018/0335865 A1* | 11/2018 | Choi | G06F 3/041 |
| 2019/0004641 A1* | 1/2019 | Huang | G02F 1/133514 |
| 2019/0008041 A1* | 1/2019 | Nakamura | G06F 3/0445 |
| 2020/0073514 A1 | 5/2020 | Kuo | |

FOREIGN PATENT DOCUMENTS

| | | |
|---|---|---|
| CN | 204790951 U | 11/2015 |
| CN | 105786256 A | 7/2016 |
| CN | 108803945 A | 11/2018 |

\* cited by examiner

TOUCH ELECTRODE STRUCTURE, TOUCH SCREEN AND TOUCH DISPLAY DEVICE

TECHNICAL FIELD

The embodiments of the present disclosure relate to a touch electrode structure, a touch screen and a touch display device.

BACKGROUND

The touch panel can sense touch operation from a finger or a stylus using various technologies, such as capacitive, surface acoustic wave, resistive and optical touch technologies. Capacitive touch technology has been developed very rapidly due to its high reliability and good durability. It has been widely used in mobile phones, tablets, notebook computers and other electronic products. The capacitive touch technology can be divided into self-capacitance touch technology and mutual capacitance touch technology. Capacitive touch panels usually use transparent conductive materials to form touch sensing elements and are formed on the display panel. Factors such as pattern and size of touch sensing elements of the touch panel formed on the display panel will affect the display quality of images.

For example, a self-capacitance touch screen includes a touch electrode array made of transparent conductive material on a base substrate, and these touch electrodes respectively form capacitors with ground. When a finger touches the self-capacitance capacitive screen, the capacitance of the finger will be superimposed on the corresponding touch electrode, and the touch detection chip can determine the touch position by detecting the change of the capacitance value of each touch electrode during the touch period.

SUMMARY

At least one embodiment of the present disclosure provides a touch electrode structure, the touch electrode structure includes: a plurality of touch electrode blocks electrically insulated from each other, wherein each of the plurality of touch electrode blocks includes a main body portion and a sawtooth portion electrically connected to the main body portion, and the sawtooth portions opposite to each other in adjacent touch electrode blocks are nested with each other.

For example, in the touch electrode structure provided by at least one embodiment of the present disclosure, the sawtooth portion includes a plurality of protrusions extending in a direction from the main body portion to a position away from the main body portion, the main body portion and each of the plurality of protrusions both include a grid structure, and the grid structure includes grid lines and a hollow region.

For example, in the touch electrode structure provided by at least one embodiment of the present disclosure, the grid lines include a plurality of sawtooth strips, each of the plurality of sawtooth strips includes an extension portion and a corner portion, the extension portions of adjacent sawtooth strips are spaced apart from each other, and at least corner portion of each sawtooth strip is connected to the corner portion of the sawtooth strip adjacent thereto to form the grid lines.

For example, in the touch electrode structure provided by at least one embodiment of the present disclosure, in the sawtooth portion, an extension direction of each of the plurality of sawtooth strips is consistent with an extension direction of each protrusion; in the main body portion, the extension direction of each of the plurality of sawtooth strips intersects with an extension direction of an outer contour of the main body portion.

For example, in the touch electrode structure provided by at least one embodiment of the present disclosure, the main body portion has an outer contour of a rectangle or a parallelogram, the main body portion includes two first edges opposite to each other and two second edges opposite to each other, a length of the first edges is greater than a length of the second edges, the first edges are provided with the sawtooth portion, and the sawtooth portion provided on the first edges is a first sawtooth portion.

For example, in the touch electrode structure provided by at least one embodiment of the present disclosure, the first sawtooth portion includes a plurality of the protrusions, and on the same first edge, adjacent protrusions have an equal minimum distance.

For example, in the touch electrode structure provided by at least one embodiment of the present disclosure, on two sides of the main body portion away from the two first edges, one of the protrusions on one end of the same first edge is one first protrusion, or two of the protrusions on two ends of the same first edge are two first protrusions; one or more protrusions on the same first edge except for the one or two first protrusions are one or more second protrusions, and an area of each first protrusion is half of an area of each second protrusion.

For example, in the touch electrode structure provided by at least one embodiment of the present disclosure, an extension length of the first protrusion from the first edge and an extension length of the second protrusion from the same first edge are equal, and a width of the first protrusion in an extension direction of the first edge is half of a width of the second protrusion in the extension direction of the same first edge.

For example, in the touch electrode structure provided by at least one embodiment of the present disclosure, a shape of the second protrusion is approximately an isosceles triangle, an isosceles trapezoid or a rectangle, a shape of the first protrusion is approximately a right triangle, a right trapezoid or a rectangle.

For example, in the touch electrode structure provided by at least one embodiment of the present disclosure, the plurality of touch electrode blocks have the same shape, and each of the plurality of touch electrode blocks includes one first protrusion on one end of the same first edge.

For example, in the touch electrode structure provided by at least one embodiment of the present disclosure, the second edges of the main body portion are also provided with the sawtooth portion, and the sawtooth portion provided on the second edges is a second sawtooth portion.

For example, in the touch electrode structure provided by at least one embodiment of the present disclosure, the second sawtooth portion includes a plurality of the protrusions, and on the same second edge, adjacent protrusions have an equal minimum distance.

For example, in the touch electrode structure provided by at least one embodiment of the present disclosure, on two sides of the main body portion away from the two second edges, one of the protrusions on one end of the same second edge is one third protrusion, or two of the protrusions on two ends of the same second edge are two third protrusions; one or more protrusions on the same second edge except the one or two third protrusions are one or more fourth protrusions, and an area of each third protrusion is half of an area of each fourth protrusion.

For example, in the touch electrode structure provided by at least one embodiment of the present disclosure, an extension length of the third protrusion from the second edge and an extension length of the fourth protrusion from the same second edge are equal, and a width of the third protrusion in an extension direction of the second edge is half of a width of the fourth protrusion in the extension direction of the same second edge.

For example, in the touch electrode structure provided by at least one embodiment of the present disclosure, the plurality of touch electrode blocks have the same or substantially the same shape of outer contours.

For example, in the touch electrode structure provided by at least one embodiment of the present disclosure, each of the plurality of touch electrode blocks has an outer contour with a substantially axisymmetric shape.

For example, at least one embodiment of the present disclosure further provides a touch screen, including the touch electrode structure according to any one of the above embodiments.

For example, the touch screen provided by at least one embodiment of the present disclosure further includes a plurality of leads, wherein the leads and the touch electrode blocks are electrically connected in one-to-one correspondence.

For example, the touch screen provided by at least one embodiment of the present disclosure further includes an insulating layer between the plurality of leads and the touch electrode structure, wherein each of the plurality of leads and the touch electrode block corresponding to the lead are electrically connected through a via hole structure penetrating through the insulating layer.

For example, in the touch screen provided by at least one embodiment of the present disclosure, the plurality of leads and the touch electrode blocks are in the same layer, two adjacent column of touch electrode blocks have a gap therebetween, the leads are arranged in the gap, and in the same column of touch electrode blocks, in an extension direction of the leads, areas of the touch electrode blocks gradually decrease or increase.

For example, in the touch screen provided by at least one embodiment of the present disclosure, upon the sawtooth portion including a protrusion extending in a direction from the main body portion to a position away from the main body portion, the main body portion and the protrusion both include a grid structure, the grid structure includes grid lines and a hollow region, and the grid lines include a plurality of sawtooth strips extending in a column direction in which the touch electrode blocks are arranged, the plurality of sawtooth strips and the leads have consistent shapes.

For example, at least one embodiment of the present disclosure further provides a touch display device, including the touch electrode structure according to any one of the above embodiments.

For example, the touch display device provided by at least one embodiment of the present disclosure further includes a display panel, wherein the touch electrode structure is arranged on the display panel.

For example, the touch display device provided by at least one embodiment of the present disclosure further includes a display panel and a touch screen arranged on a display side of the display panel, wherein the touch screen includes the touch electrode structure.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "Upper", "lower", "left", "right", etc. are only used to indicate the relative positional relationship, and when the absolute position of the object to be described is changed, the relative positional relationship may also change accordingly.

The self-capacitance touch electrode structure usually adopts a single-layer touch electrode pattern to realize accurate touch detection, which requires higher pattern design of the touch electrode structure. At present, the planar shape of the touch electrode block included in the touch electrode structure is a rectangle or rhombus. When a finger touches the middle area of the touch electrode structure, the touch precision is ±1 mm; when a finger touches the edge of the touch electrode structure, the touch precision is ±2 mm, which seriously affects the user's experience of touch products. When a stylus is used for touch, the touch precision is required to be ±0.4 mm when touching the middle area of the touch electrode structure and ±0.6 mm when touching the edge of the touch electrode structure.

Figure 1:
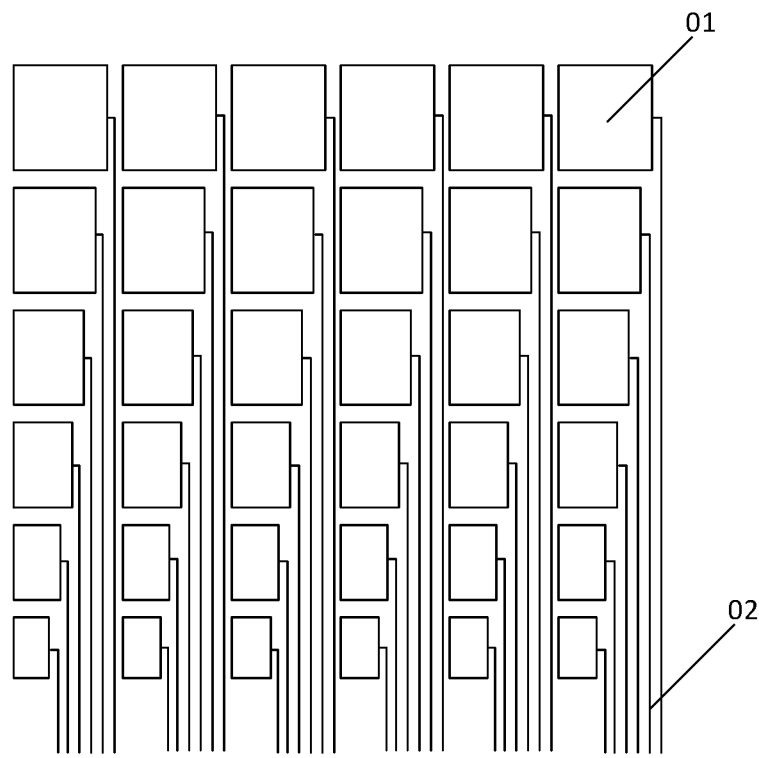
FIG. 1 is a schematic plan view of a touch electrode.

For example, FIG. 1 is a schematic plan view of a touch electrode structure. As illustrated in FIG. 1, the planar shape of each of the touch electrode blocks is rectangular. The touch electrode leads 02 are arranged between two adjacent columns of touch electrode blocks 01. The touch electrode leads 02 connect each touch electrode block 01 to a chip on film (COF) or a flexible printed circuit board (FPC), so that there will be a large gap between the two adjacent columns of touch electrode blocks 01. When a user's finger or stylus touches the gap between two adjacent columns of touch electrode blocks 01, the touch accuracy will be poor. In addition, because the planar shape of each of the touch electrode blocks 01 is rectangular, when a user's finger or stylus touches the touch electrode structure, if it mainly touches a central touch electrode block with a relatively large area, the touch effect on the touch electrode blocks around the central touch electrode block is weak, which will cause lower touch accuracy.

In addition, when the user's finger or stylus touches the edge (within 3.5 mm) of the screen, because the shape of the touch electrode block is rectangular or rhombic, there is only one touch electrode block at the edge of the screen, and no other touch electrode blocks can be touched, resulting in poor linearity at the edge of the screen. For on-cell design, the finger or stylus is very close to the touch sensing layer when touching. If the touch electrode block is designed to be rectangular or rhombic, when a finger or stylus touches the screen, the capacitance value change of the touch electrode block with the main proportion (i.e., the touch electrode block that is mainly touched) will be very large, while the capacitance value change of the touch electrode blocks (for example, eight touch electrode blocks) around it that are not touched or whose proportion is relatively small, will be relatively small, which will lead to inaccurate calculation results of touch coordinates.

Therefore, at present, designing the planar shape of the touch electrode block into a rectangle or rhombus has completely failed to meet the user's requirement for touch experience of touch products, so that the pattern design of the touch electrode structure becomes crucial.

The inventor(s) of the present disclosure found that by designing each touch electrode block to have a sawtooth portion and nesting the opposite sawtooth portions in adjacent touch electrode blocks, on the one hand, the area proportion of the main body portion of the touch electrode block can be reduced, and the probability that a plurality of sawtooth portions are touched at the same time is greatly improved during touch operation, so that a plurality of touch electrode blocks including the touched sawtooth portions can generate detection signals, thereby improving touch detection accuracy, so as to avoid the problems of poor touch detection precision, poor linearity and poor uniformity of the current touch products. Moreover, for example, when the touch electrode block includes a sawtooth portion, the capacitance value change of the touch electrode blocks around the plurality of touch electrode blocks that are touched by a finger or a stylus will also be relatively large, so that coordinate positions can be accurately calculated; on the other hand, the size of the touch electrode block with a sawtooth portion can be relatively large, for example, the extension length of the protrusions in the sawtooth portion can be 0.75 times or more of the length of the rectangular touch electrode block. In these embodiments, for a touch electrode block with a substantially axisymmetric pattern, the total length of the two protrusions opposite to each other in the two sawtooth portions is 1.5 times or more of the length of the rectangular touch electrode block. In this way, compared with the current design in which the planar shape of the touch electrode block is rectangular, the number of touch electrode blocks arranged in the same area size range can be reduced, and the number of bonding pins can also be reduced. In addition, the touch electrode pattern design does not add new process steps.

At least one embodiment of the present disclosure provides a touch electrode structure. The touch electrode structure includes: a plurality of touch electrode blocks electrically insulated from each other, each touch electrode block includes a main body portion and a sawtooth portion electrically connected to the main body portion, and opposite sawtooth portions in adjacent touch electrode blocks are nested with each other. According to this embodiment of the present disclosure, the touch electrode blocks are arranged in a structure with a sawtooth portion, and the touch detection precision is improved by nesting the opposite sawtooth portions in adjacent touch electrode blocks with each other.

It should be noted that nesting with each other means that the gaps between the protrusions included in one sawtooth portion of one touch electrode block are just filled by the protrusions included in another sawtooth portion, which are opposite to this sawtooth portion, of another touch electrode block adjacent to this touch electrode block. Of course, the protrusions of these adjacent touch electrode blocks have predetermined gaps therebetween to be insulated from each other.

Figure 2:
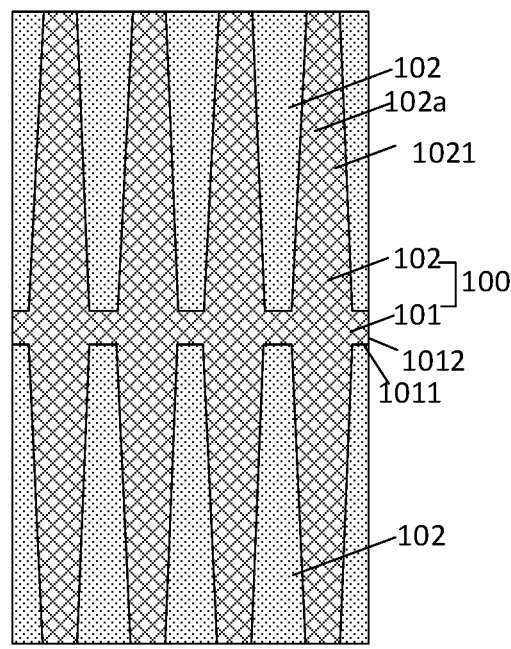
FIG. 2 is a schematic plan view of a touch electrode structure according to an embodiment of the present disclosure.

For example, FIG. 2 is a schematic plan view of a touch electrode structure provided by an embodiment of the present disclosure. As illustrated in FIG. 2, the touch electrode structure 10 includes a plurality of touch electrode blocks 100 electrically insulated from each other, each touch electrode block 100 includes a main body portion 101 and a sawtooth portion 102 electrically connected to the main body portion 101, and sawtooth portions 102 opposite to each other in adjacent touch electrode blocks 100 are nested with each other.

For example, the main body portion 101 and the sawtooth portion 102 of each touch electrode block 100 are of an integrated structure, so that the shape of the touch electrode structure can be easily designed and the manufacturing cost can be reduced. The main body portion 101 and the sawtooth portion 102 of each touch electrode block 100 can also be of a non-integral structure, and which are not limited herein.

For example, FIG. 2 illustrates only one complete touch electrode block 100 including both a main body portion 101 and a sawtooth portion 102, and two touch electrode blocks adjacent to the complete touch electrode block 100 illustrating only the sawtooth portion 102 without illustrating the main body portion.

For example, the shape of the outer contour of the main body portion can be a rectangle or a parallelogram, and FIG. 2 takes the shape of the outer contour of the main body portion 101 being a rectangle as an example. As illustrated in FIG. 2, the main body portion 101 includes two opposite first edges 1011 and two opposite second edges 1012, and the length of the first edges 1011 is greater than the length of the second edges 1012. In the illustrated example, both the two first edges 1011 are provided with the sawtooth portion 102, the sawtooth portion provided on the first edges 1011 is a first sawtooth portion 102a, and the sawtooth portion is not provided on the two second edges 1012.

For example, the ratio of the length of the first edge 1011 to the length of the second edge 1012 is 5 to 30. For example, the ratio of the length of the first edge 1011 to the length of the second edge 1012 is 5, 10, 15, 20, 25 or 30, etc.

For example, if the sawtooth portion is also provided on the two second edges 1012 of the main body portion 101, the main body portion 101 needs to have a certain width. Therefore, only providing the first sawtooth portion 102a on the two opposite first edges 1011 of the main body portion 101 can set the length of the second edge 1012 of the main body portion 101 to be very small, i.e., the main body portion 101 to be very narrow, which can make the proportion of the area occupied by the main body portion 101 relatively smaller, and thus the probability of a user's finger or stylus touching a plurality of touch electrode blocks 100 at the same time during touch operation will be larger.

For example, as illustrated in FIG. 2, each sawtooth portion 102 includes a plurality of protrusions 1021 extending from the main body portion 101 to a direction away from the main body portion 101, and each protrusion 1021 is substantially axisymmetric. FIG. 2 illustrates that the planar shape of the protrusion 1021 is an isosceles trapezoid, and the width of the protrusion 1021 gradually decreases along the direction from the main body portion 101 to a position away from the main body portion 101. The length of the shorter edge of the two parallel opposite edges of each isosceles trapezoid is the minimum gap width between two adjacent protrusions 1021, and the length of the longer edge is the maximum gap width between two adjacent protrusions 1021.

For example, in FIG. 2, each first sawtooth portion 102a of the two first sawtooth portions 102a included in a complete touch electrode block 100 has four protrusions 1021. Obviously, the number of protrusions 1021 included in each first sawtooth portion 102a is not limited to this, but the number of the protrusions can be more or less than four, for example, 2, 3, 5 or 6.

For example, as illustrated in FIG. 2, on the same first edge 1011, the minimum distances between adjacent protrusions 1021 are equal except for the edge region, and this is advantageous for forming protrusions 1021 of uniform size, and is also advantageous for forming protrusions of uniform shape and size nested in gaps between any two adjacent protrusions 1021. In this way, the shapes and sizes of all the protrusions 1021 included in the two sawtooth portions 102 nested with each other are the same, thus being more advantageous for improving the touch detection accuracy.

For example, as illustrated in FIG. 2, in a complete touch electrode block 100, each protrusion 1021 has the same shape, each protrusion 1021 has the same length extending along a direction from the main body portion 101 to the position away from the main body portion 101, any two adjacent protrusions 1021 have an equal gap therebetween, and the gap has a planar shape the same as that of the protrusion 1021, and the gap can just accommodate the protrusion 1021 which is inverted.

For example, in a complete touch electrode block 100, the planar shape of each protrusion 1021 is approximately axisymmetric. In addition to the planar shape of the protrusion 1021 illustrated in FIG. 2 being an isosceles trapezoid, the planar shape of the protrusion 1021 can also be an isosceles triangle, an isosceles triangle with sawtooth edges on two sides, a rectangle, a rectangle with sawtooth edges on two sides, and an isosceles trapezoid with sawtooth edges on two sides, etc.

For example, as illustrated in FIG. 2, for the complete touch electrode block 100, protrusions are not provided at the two ends of the main body portion 101, and the touch electrode blocks adjacent to this complete touch electrode block 100 are provided with protrusions at the two ends of the corresponding main body portions 101.

Figure 3:
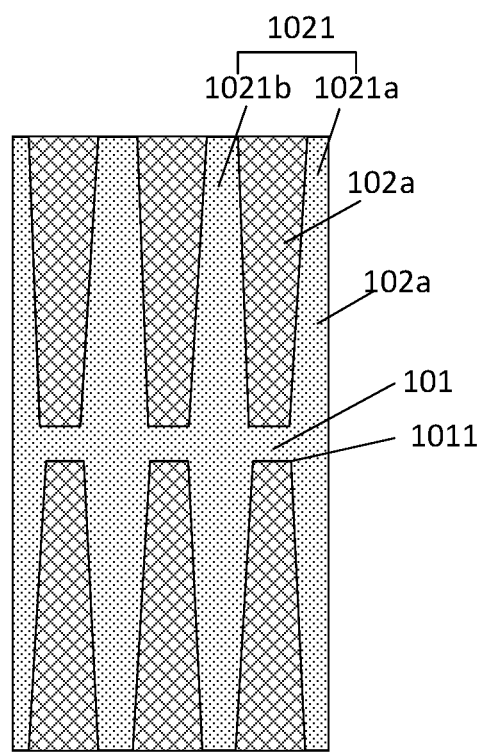
FIG. 3 is a schematic plan view of another touch electrode structure according to an embodiment of the present disclosure.

For example, FIG. 3 is a schematic plan view of another touch electrode structure according to an embodiment of the present disclosure. As illustrated in FIG. 3, the planar shape of the protrusion 1021 is also taken as an isosceles trapezoid for example. On two sides of the main body portion 101 away from the two first edges 1011, one protrusion 1021 at one end of the same first edge 1011 is a first protrusion 1021a (or two protrusions at two ends of the same first edge are first protrusions), and the protrusions 1021 on the same first edge 1011 except for the first protrusions 1021a are second protrusions 1021b. For example, the extension length of the first protrusion 1021a from the first edge 1011 and the extension length of the second protrusion 1021b from the same first edge 1011 are equal, and the width of the first protrusion 1021a along the extension direction of the first edge 1011 is half of the width of the second protrusion 1021b along the extension direction of the same first edge 1011. In this way, the area of the first protrusion 1021a is half of the area of the second protrusion 1021b, that is, the shape of the first protrusion 1021a is a pattern in which the axisymmetric second protrusion 1021b is cut half along the axis of symmetry, so that the opposite first sawtooth portions 102a in adjacent touch electrode blocks 100 can be nested with each other, and the areas of the nested first sawtooth portions 102a are equal.

In FIG. 3, first protrusions 1021a are provided at two ends of the same first edge 1011. In this way, in the two nested first sawtooth portions 102a, one first sawtooth portion 102a includes three second protrusions 1021b, the other first sawtooth portion 102a includes two second protrusions 1021b and two first protrusions 1021a, and the two first protrusions 1021a are respectively arranged at the two ends of the main body portion 101, the area of one of the first protrusions 1021a is half of the area of one of the second protrusions 1021b, so that the areas of the two nested first sawtooth portions 102a are equal.

Figure 4:
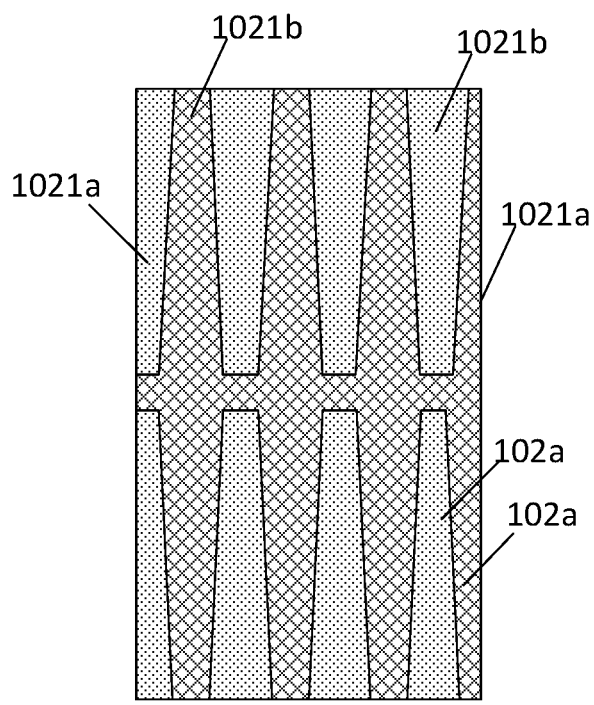
FIG. 4 is a schematic plan view of another touch electrode structure according to an embodiment of the present disclosure.

For example, FIG. 4 is a schematic plan view of another touch electrode structure provided by an embodiment of the present disclosure. As illustrated in FIG. 4, for one of the two first sawtooth portions 102a nested with each other, only one end of the main body portion 101 is provided with one first protrusion 1021a, and the other end of the main body portion 101 is provided with the first protrusion 1021a of the other first sawtooth portion 102a nested with this first sawtooth portion 102a. Thus, in the two first sawtooth portions 102a nested with each other, one first sawtooth portion 102a includes three second protrusions 1021b and one first protrusion 1021a, and the one first protrusion 1021a is located at one end of the main body portion 101; the other first sawtooth portion includes three second protrusions 1021b and one first protrusion 1021a, and the one first protrusion 1021a is located at the other end of the main body portion 101. In this way, the areas of the two nested first sawtooth portions 102a are equal.

For example, the shape of the second protrusion 1021b can also be an isosceles triangle, an isosceles trapezoid or a rectangle, and correspondingly, the shape of the first protrusion 1021a is approximately a right triangle, a right trapezoid or a rectangle. It should be noted that the edges of the right triangle, right trapezoid or rectangle may not be completely straight.

It should be noted that the first protrusion 1021a and the second protrusion 1021b can also be of other suitable shapes, as long as the two adjacent first sawtooth portions 102a can be nested with each other, and the second protrusions 1021b included in the two first sawtooth portions 102a have the same shape and the same size, which will not be repeated herein.

Figure 5:
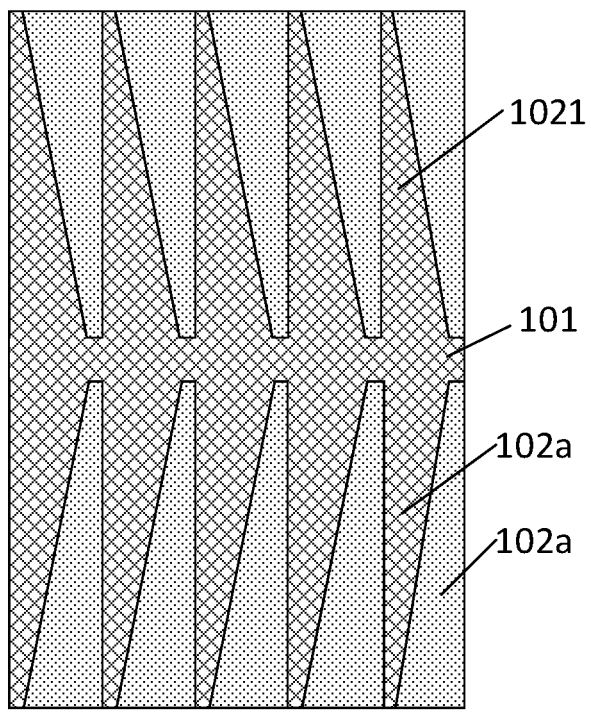
FIG. 5 is a schematic plan view of another touch electrode structure according to an embodiment of the present disclosure.

For example, FIG. 5 is a schematic plan view of another touch electrode structure provided by an embodiment of the present disclosure. As illustrated in FIG. 5, the planar shape of the protrusion 1021 is a non-axisymmetric pattern. FIG. 5 illustrates the planar shape of the protrusion 1021 as a right angle trapezoid, and the width of the protrusion 1021 gradually decreases along the direction from the main body portion 101 to the position away from the main body portion 101. The length of the shorter one of the two parallel opposite edges of each right angle trapezoid is the minimum gap width between the adjacent two protrusions 1021, and the length of the longer one is the maximum gap width between the adjacent two protrusions 1021.

For example, as illustrated in FIG. 5, all the protrusions 1021 included in the two nested first sawtooth portions 102a have the same shape and the same size. One end of the main body portion 101 is provided with a protrusion 1021 of one of the two nested first sawtooth portions 102a, and the other end of the main body portion 101 is provided with a protrusion 1021 of the other one of the two nested first sawtooth portions 102a. Each of the two first sawtooth portions 102a includes five protrusions 1021 of the same shape and the same size, so that the areas of the two nested first sawtooth portions 102a are approximately equal to each other.

It should be noted that the planar shape of the protrusion 1021 can also be non-axisymmetric shapes such as right triangle, right triangle with sawtooth edges on two sides, right trapezoid with sawtooth edges on two sides, etc. The number of protrusions 1021 included in each first sawtooth portion 102a is not limited to five as illustrated in FIG. 5, but can be other numbers, and is not limited herein.

Figure 6A:
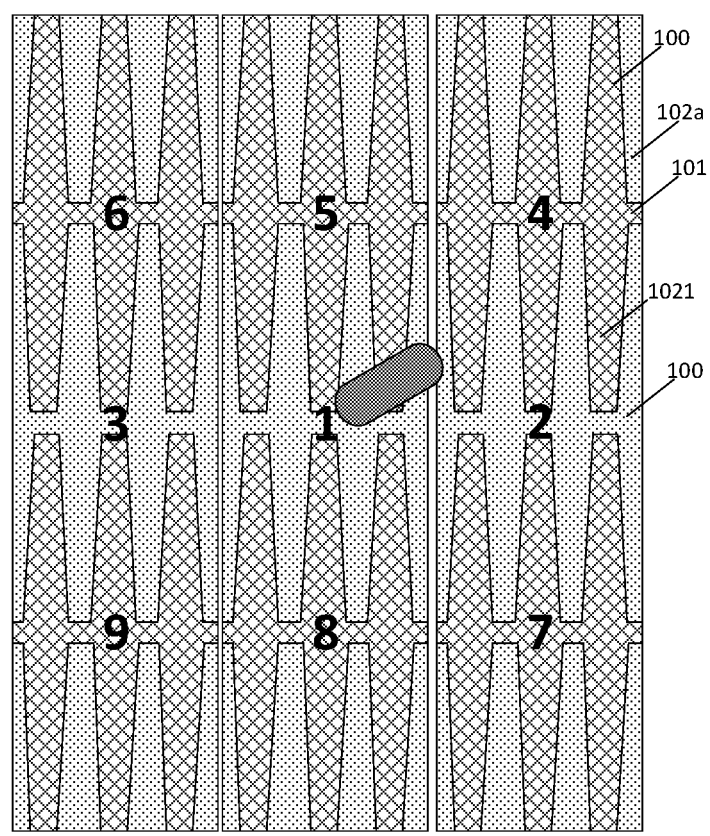
FIG. 6A is a schematic plan view of a touch electrode structure including a plurality of touch electrode blocks according to an embodiment of the present disclosure.

For example, FIG. 6A is a schematic plan view of a touch electrode structure including a plurality of touch electrode blocks according to an embodiment of the present disclosure. As illustrated in FIG. 6A, each touch electrode block 100 of the plurality of touch electrode blocks has an equal area. FIG. 6A includes nine complete touch electrode blocks 100 and six touch electrode blocks that only include a part of the first sawtooth portion 102a.

For example, as illustrated in FIG. 6A, the outer contours of the plurality of touch electrode blocks 100 have the same or approximately the same shape. For example, one touch electrode block 100 is not provided with protrusions at both ends of the main body portion 101, and the touch electrode block 100 adjacent thereto in the column direction, in which the touch electrode blocks are arranged, is provided with protrusions 1021 at two ends of the main body portion 101. It can be considered that the outer contours of the two touch electrode blocks 100 adjacent to each other in the column direction, in which the touch electrode blocks are arranged, are approximately the same.

For example, as illustrated in FIG. 6A, the shape of the outer contour of each touch electrode block 100 is approximately axisymmetric, and the outer contour of each touch electrode block 100 is axisymmetric about the centerline of its main body portion 101 parallel to the first edges.

For example, as illustrated in FIG. 6A, the shape formed by completely nesting one first sawtooth portion 102a included in one touch electrode block 100 and another first sawtooth portion 102a included in the touch electrode block 100 adjacent thereto is rectangular.

For example, as illustrated in FIG. 6A, when a user touches a touch screen including the touch electrode structure of FIG. 6A with a finger or a stylus, because each touch electrode block 100 includes a first sawtooth portion 102a, the user's finger or stylus will normally touch at least two or more touch electrode blocks 100, while in a large size touch product, for the touch electrode blocks with a rectangular or rhombic planar shape, only one touch electrode block may be touched. The principle of capacitive touch positioning is usually that nine touch electrode blocks sense the change of capacitance at the same time, and the touch position of a finger or stylus is judged by the change of capacitance. When touch electrode blocks with sawtooth portions are adopted, a user's finger or a stylus can touch a plurality of adjacent touch electrode blocks, and the change of capacitance of the plurality of touch electrode blocks is obvious, so that the touch detection precision can be improved.

As illustrated in FIG. 6A, when the user's finger or stylus touches the position illustrated in FIG. 6A, the capacitance values obtained by testing the touch electrode blocks labeled 1, 2, 3, 4, 5, 6, 7, 8 and 9 in FIG. 6A are illustrated in table 1 below.

TABLE 1

| Rows | Columns | | |
|---|---|---|---|
| | The first column | The second column | The third column |
| The first row | 1.05 (6) | 2.76 (5) | 1.84 (4) |
| The second row | 1.98 (3) | 3.35 (1) | 2.69 (2) |
| The third row | 0.43 (9) | 1.06 (8) | 0.71 (7) |

As can be seen from FIG. 6A, the user's finger or stylus touches the three touch electrode blocks labeled 1, 2 and 5 in FIG. 6A. As can be seen from table 1, the capacitance value of the tested touch electrode block labeled 1 is the largest, followed by the capacitance values of the touch electrode blocks labeled 5 and 2, the other touch electrode blocks have also been detected corresponding capacitance values. The accurate touch position can be determined through the above capacitance value calculation.

Figure 6B:
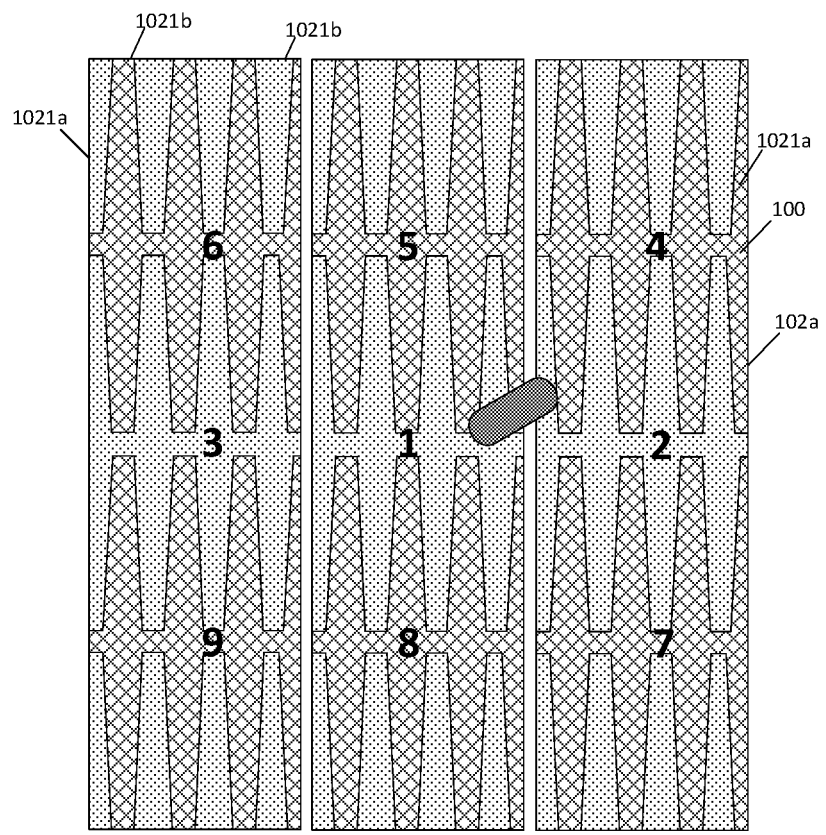
FIG. 6B is a schematic plan view of another touch electrode structure including a plurality of touch electrode blocks according to an embodiment of the present disclosure.

For example, as illustrated in FIG. 6B, it can also be that the shape of the plurality of touch electrode blocks 100 is the same, and each of the plurality of touch electrode blocks 100 includes a first protrusion 1021a at one end of the same first edge. The test values of the touch electrode blocks labeled 1, 2, 3, 4, 5, 6, 7, 8 and 9 in FIG. 6B can also refer to the relevant description in FIG. 6A. Other features of FIG. 6B can refer to the relevant description in FIG. 6A above and will not be described here again.

Figure 7:
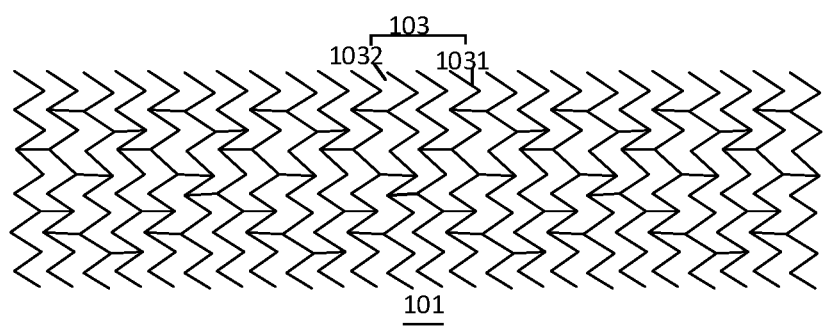
FIG. 7 is a schematic view of an exemplary enlarged structural view showing a part of the main body in FIGS. 2-6B.

For example, FIG. 7 is a schematic view of an exemplary enlarged structure of a part of the main body in FIGS. 2-6B. As illustrated in FIG. 7, the main body portion 101 includes a grid structure 103, the grid structure 103 includes grid lines 1031 and a hollow region 1032. The entire extension direction of the grid structure 103 is the same as the extension direction of the outer contour of the main body portion 101, and both the grid structure and the main body portion are rectangular.

For example, the hollow region 1032 can reduce the area of the main body portion 101 itself, can also reduce its own resistance, can also reduce the capacitance between the main body portion 101 and the pixel electrode formed subsequently, and can further solve the problem of shadow elimination.

Figure 8:
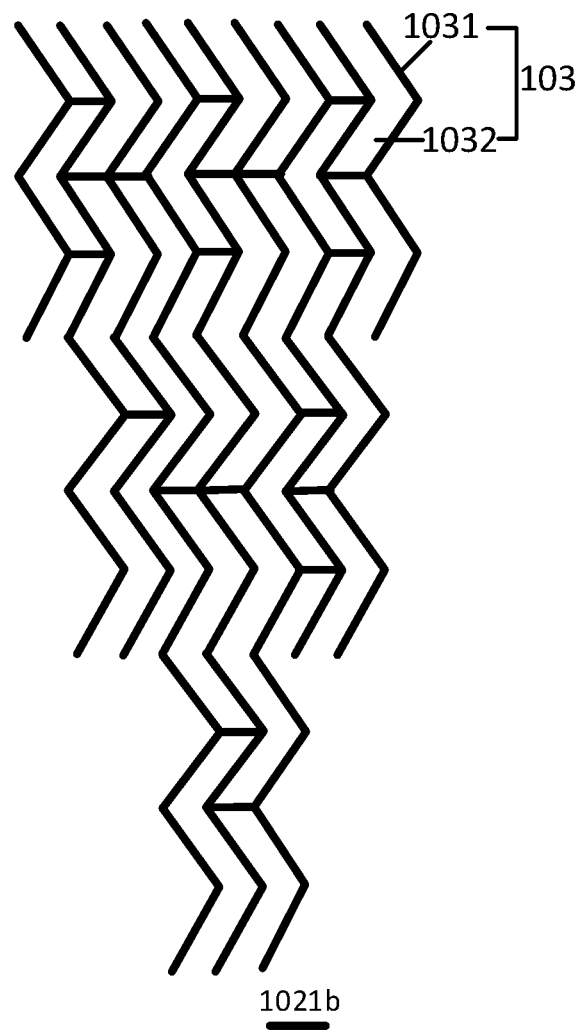
FIG. 8 is a schematic view of an exemplary enlarged structural view showing a part of the second protrusion in FIGS. 2-4 and FIGS. 6A and 6B.

For example, FIG. 8 is a schematic view of an exemplary enlarged structural view of a part of the second protrusion in FIGS. 2-4 and FIGS. 6A and 6B. As illustrated in FIG. 8, the second protrusion 1021b also includes a grid structure 103, the grid structure 103 also includes grid lines 1031 and a hollow region 1032. The entire extension direction of the grid lines 1031 is consistent with the extension direction of the second protrusion 1021b, and the width of the entirety of the grid lines 1031 gradually narrows, and the entire shape is isosceles trapezoid. For example, the hollow region 1032 can reduce the area of the second protrusion 1021b itself, can also reduce its own resistance, can also reduce the capacitance between the second protrusion 1021b and the pixel electrode formed subsequently, and can further solve the problem of shadow elimination.

For example, the extension direction of each grid line 1031 in the second protrusion 1021b and the extension direction of each grid line 1031 in the main body portion 101 are the same, and are perpendicular to the extension direction of the outer contour of the main body portion 101.

Figure 9:
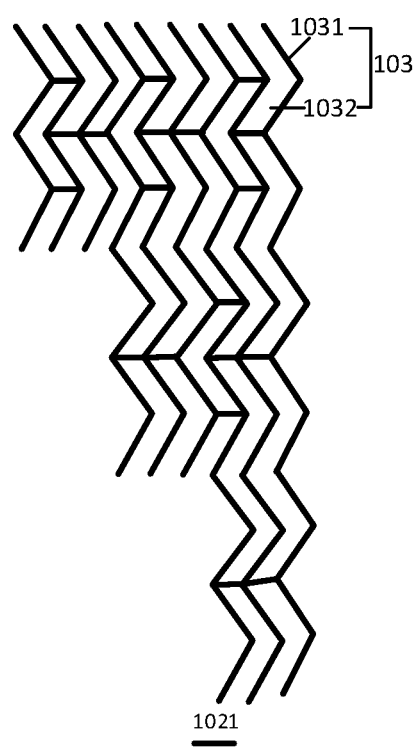
FIG. 9 is a schematic view of an exemplary enlarged structural view showing a part of the protrusion in FIG. 5 and the first protrusion in FIGS. 2-4, 6A and 6B.

For example, FIG. 9 is a schematic view of an exemplary enlarged structural view of a part of the protrusion in FIG. 5 and the first protrusion in FIGS. 2-4, 6A and 6B. Taking the protrusion 1021 in FIG. 5 as an example, as illustrated in FIG. 9, the protrusion 1021 also includes a grid structure 103, the grid structure 103 includes grid lines 1031 and a hollow region 1032. The entire extension direction of the grid lines 1031 is consistent with the extension direction of the protrusion 1021, and the width of the entirety of the grid lines gradually narrows, and the entire shape is approximately a right trapezoid. For example, the hollow region 1032 can reduce the area of the protrusion 1021 itself, can also reduce its own resistance, and can also reduce the capacitance between the protrusion 1021 and the pixel electrode formed subsequently, thus solving the problem of shadow elimination.

For example, the schematic views of an exemplary enlarged structural view of a part of the protrusion in FIGS. 2-4, 6A and 6B can be seen in the relevant description in FIG. 9, and will not be described here again.

For example, the hollow region 1032 included in the main body portion 101 and the protrusion 1021 (including the first protrusion 1021a and the second protrusion 1021b) can reduce the area of each touch electrode block itself, and can also increase the area occupied by each touch electrode block 100, so that compared with touch electrode blocks with rectangular or rhombic planar shapes, the number of touch electrode blocks can be reduced, and the problem of shadow elimination can be solved at the same time.

It should be noted that the extension direction of the grid lines does not refer to the extension of the grid lines of a local region in the transverse direction and the longitudinal direction, but the entire direction of the grid lines. The lines along the extension direction of the grid line can be straight lines or fold lines. In FIGS. 7, 8 and 9, the grid lines are all taken as fold lines for illustration. When the grid lines are straight lines, only the fold lines need to be changed into straight lines. Other details can be seen in the above-mentioned descriptions of FIGS. 7, 8 and 9, and will not be repeated here.

Figure 10:
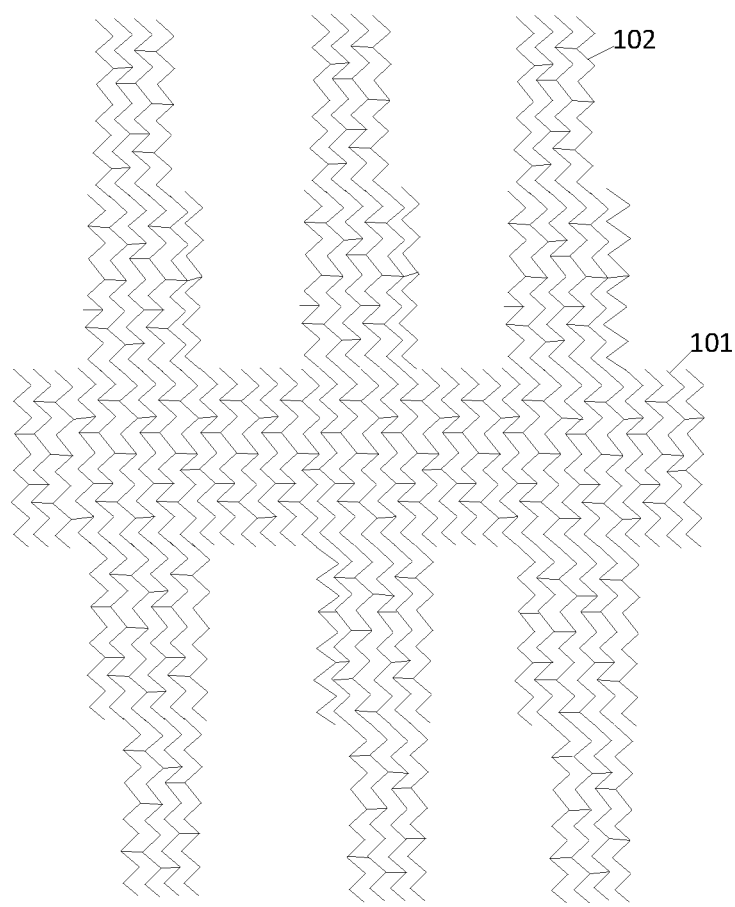
FIG. 10 is a grid diagram of a touch electrode block according to an embodiment of the present disclosure.

For example, FIG. 10 is a grid diagram of a touch electrode block according to an embodiment of the present disclosure. As illustrated in FIG. 10, both the main body portion 101 and the sawtooth portion 102 include grid lines, and the vertical grid lines in the main body portion 101 is connected to the corresponding vertical grid lines in the sawtooth portion 102.

Figure 11:
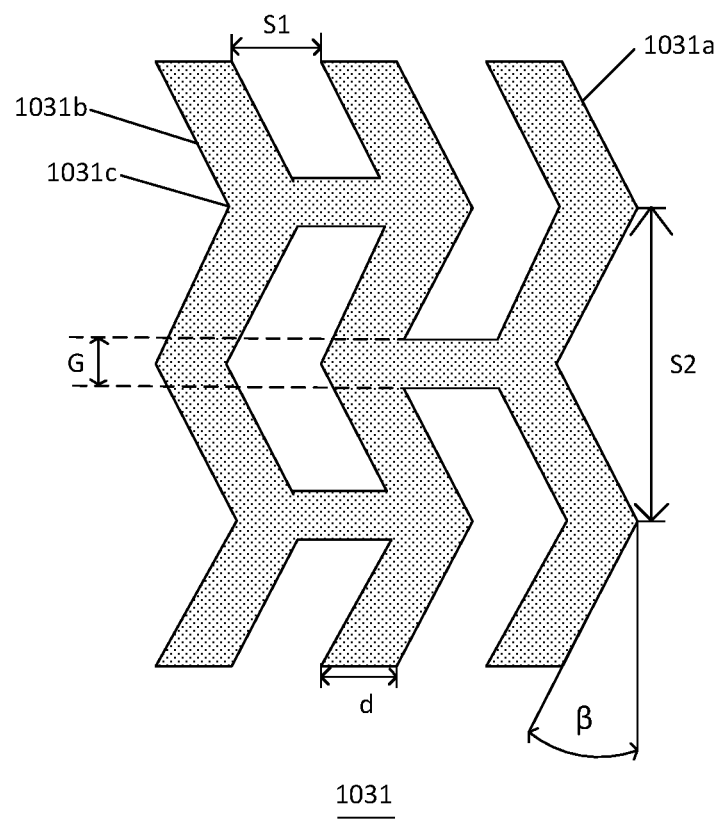
FIG. 11 is a schematic view of an exemplary enlarged structural view showing a part of the grid line in FIGS. 7-10.

For example, FIG. 11 is a schematic view of an exemplary enlarged structural view of a part of the grid lines in FIGS. 7-10. As illustrated in FIG. 11, the grid lines 1031 are fold lines, and the grid lines 1031 include a plurality of sawtooth strips 1031a, each sawtooth strip 1031a includes one or more extension portions 1031b and one or more corner portions 1031c, the extension portions 1031b of adjacent sawtooth strips 1031a are spaced apart from each other, and the adjacent extension portions 1031b of adjacent sawtooth strips 1031a are parallel to each other, and at least one corner portion 1031c of each sawtooth strip 1031a and the corner portion 1031c of the sawtooth strip 1031a adjacent thereto are connected to form the grid lines 1031.

For example, in the sawtooth portion 102, the extension direction of the sawtooth strips 1031a are consistent with the extension direction of the protrusion 1021; in the main body portion 101, the extension direction of the sawtooth portions 1031a intersects with the extension direction of the outer contour of the main body portion 101.

For example, as illustrated in FIG. 11, the width of each sawtooth strip 1031a is from 7 μm to 80 μm; the distance between two adjacent sawtooth strips 1031a is from 6 μm to 20 μm; in the same sawtooth strip 1031a, the distance S2 between adjacent corner portions 1031c is from 100 μm to 400 μm; the inclination angle β of the extension portion 1031b of the sawtooth strip 1031a is from 0 to 40 degrees; the width G of the line connecting the two adjacent sawtooth strips 1031a is from 6 μm to 20 μm.

For example, the design of the shape and size according to the above-mentioned description of the sawtooth strips 1031a is the same as the design of the pixel electrode (not illustrated in the figure), so that the problem of shadow elimination can be better solved, and the sawtooth strips can be easily realized in the manufacturing process.

It should be noted that when the inclination angle β of the extension portion 1031b of the sawtooth strip 1031a is 0 degree, the fold lines become straight lines. In some embodiments, the grid lines 1031 include a plurality of straight lines parallel to each other, and any two adjacent straight lines are connected to each other.

It should be noted that each sawtooth strip 1031a needs to be connected to all the sawtooth strips 1031a adjacent to it, which can be connected at one place or at a plurality of places.

Figure 12:
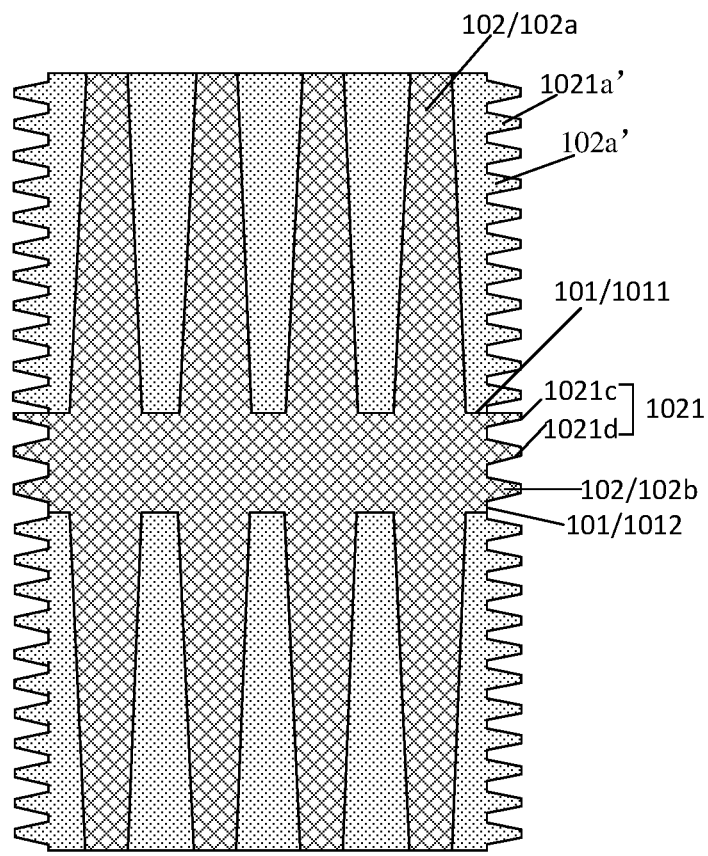
FIG. 12 is a schematic plan view of another touch electrode structure according to an embodiment of the present disclosure.

For example, FIG. 12 is a schematic plan view of another touch electrode structure according to an embodiment of the present disclosure. As illustrated in FIG. 12, the sawtooth portion 102 is provided on both the first edge 1011 and the second edge 1012 of the main body portion 101, the sawtooth portion 102 provided on the first edge 1011 is the first sawtooth portion 102a, and the sawtooth portion 102 provided on the second edge 1012 is the second sawtooth portion 102b.

For example, the second sawtooth portion 102b provided on the second edge 1012 also includes a plurality of protrusions 1021, and on the same second edge 1012, the minimum distances between adjacent protrusions 1021 are equal. For example, on the same second edge 1012, the minimum distances between adjacent protrusions 1021 are equal, which is beneficial to improving touch accuracy.

For example, on the two sides of the main body portion 101 away from the two second edges 1012, one protrusion 1021 at one end of the same second edge 1012 is a third protrusion 1021c (or two protrusions 1021 at two ends of the same second edge 1012 are third protrusions 1021c); the one or more protrusions 1021 except the third protrusion 1021c on the same second edge 1012 are one or more fourth protrusions 1021d, and the area of one third protrusion 1021c is half of the area of one fourth protrusion 1021d.

For example, the extension length of the third protrusion 1021c from the second edge 1012 is equal to the extension length of the fourth protrusion 1021d from the same second edge 1012, and the width of the third protrusion 1021c along the extension direction of the second edge 1012 is half of the width of the fourth protrusion 1021d along the extension direction of the same second edge 1012, so that the area of the third protrusion 1021c can be realized to be half of the area of the fourth protrusion 1021d.

For example, as illustrated in FIG. 12, the first sawtooth portion 102a is provided on the two opposite first edges 1011 of the main body portion 101 of the touch electrode block, and the second sawtooth portion 102b is provided on both of the two opposite second edges 1012. In a direction parallel to the second edges 1012, nested with the first sawtooth portion 102a is a first sawtooth portion 102a' in an adjacent touch electrode block, and a sawtooth structure is provided on an edge of the first protrusion 1021a' of the first sawtooth portion 102a' parallel to the second edge 1012. The sawtooth structure includes a plurality of first sub protrusions, the extension length of the first sub protrusions from the edge of the first protrusion 1021a' parallel to the second edge 1012 is the same as the extension length of the protrusions 1021 provided on the second edge 1012 from the second edge 1012. The design of the touch electrode structure can enable that, in a direction parallel to the first edges 1011, the second sawtooth portion 102b and the sawtooth portion corresponding to the second sawtooth portion 102b in the adjacent touch electrode block are nested with each other, and simultaneously enable that the sawtooth structure included in the first protrusion 1021a' and the corresponding sawtooth structure included in the adjacent touch electrode block are nested with each other. Therefore, in a direction parallel to the first edge 1011, adjacent the touch electrode blocks can be spliced, and in a direction parallel to the second edge 1012, adjacent the touch electrode blocks can also be spliced to form a structure covering the entire plane.

It should be noted that the nesting between the sawtooth structures means that the gaps between the first sub protrusions included in the sawtooth structure of a first protrusion is just filled by the first sub protrusions included in an opposite sawtooth structure of another first protrusion adjacent to the first protrusion; of course, there is a predetermined gap between the first sub protrusions of these adjacent first protrusions to be insulated from each other.

It should be noted that in the same touch electrode block, the structures of different sawtooth portions 102 can be the same or different, and the shapes of different sawtooth portions 102 are not limited. The embodiment illustrated in FIG. 11 is only a schematic illustration, and the number of touch electrode blocks and the number of sawtooth portions 102 in each of the touch electrode blocks are not limited to the embodiment illustrated in FIG. 11. Setting the touch electrode block in an axisymmetric structure can facilitate the layout and manufacture of the touch electrode blocks.

It should also be noted that although the first protrusion 1021a' includes a sawtooth structure, it can also be considered that the shape and area of the outer contour of the touch electrode block including the first protrusion 1021a' and the shape and area of other touch electrode blocks that do not include the sawtooth structure are approximately the same, because the size of the sawtooth structure is very small relative to the entire touch electrode block.

For example, in other embodiments, the touch electrode blocks can also be of non-axisymmetric patterns, as long as the shapes and areas of two adjacent touch electrode blocks are the same and have sawtooth portions nested with each other to increase the accuracy of touch detection.

It should be noted that the shape of the main body portion is not limited to a rectangle, as long as the opposite sawtooth portions in two adjacent touch electrode blocks can be nested with each other.

The size of the touch electrode structure of each embodiment of the present disclosure needs to meet the requirement of touch detection accuracy, and the density and the occupied area of the touch electrode block can be selected according to the required touch density to ensure the required touch detection accuracy. For example, the area of each touch electrode block is 6 mm$^2$ or more and 40 mm$^2$ or less. However, the density of the display screen is usually in the micron range, therefore, a touch electrode structure generally corresponds to a plurality of sub pixels in the display screen.

For example, in at least one embodiment of the present disclosure, the materials of the plurality of touch electrode blocks in each touch electrode structure can be transparent conductive materials, for example, transparent metal oxides such as indium tin oxide (ITO) and indium zinc oxide (IZO), but the material of the touch electrode block in the embodiment of the present disclosure is not limited thereto.

For example, in the touch electrode structure provided by at least one embodiment of the present disclosure, each touch electrode block can be formed using the same patterning process, but is not limited thereto.

It should be understood that in the embodiments of the present disclosure, the patterning process can include only a photolithography process, or can include a photolithography process and an etching step, or can include printing, ink jet, or other processes for forming a predetermined pattern. Lithography process refers to the process including film formation, exposure, development, etc., and using photoresist, mask plate, exposure machine, etc. to form patterns. The corresponding patterning process can be selected according to the structure formed in the embodiment of the present disclosure.

At least one embodiment of the present disclosure further provides a touch screen, including the touch electrode structure in any of the above embodiments.

For example, the touch screen provided by at least one embodiment of the present disclosure further includes a plurality of leads, and the plurality of leads are electrically connected to the touch electrode blocks in one-to-one correspondence.

For example, in one example, the touch screen includes a substrate, and the touch electrode structure and the leads are arranged on the same side of the substrate. The substrate includes a display region and a frame region surrounding the display region, and in the direction perpendicular to the surface of the substrate, the projection of the touch electrode blocks and the leads on the substrate are all in the display region.

For example, in one example, the touch electrode blocks and the leads are arranged opposite to each other in a direction perpendicular to the substrate, and the touch electrode blocks and the leads are arranged in different layers.

For example, in one example, the touch screen further includes an insulating layer disposed between the leads and the touch electrode structure, and the leads and the corresponding touch electrode blocks are electrically connected through a via hole structure penetrating through the insulating layer.

Figure 13:
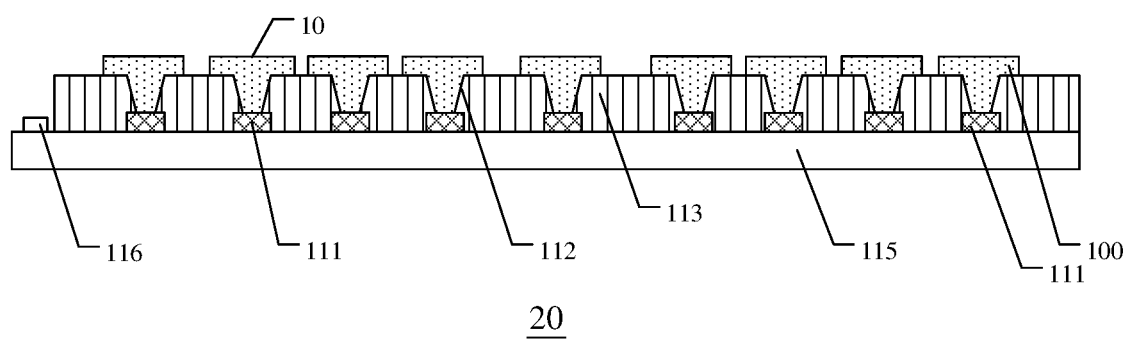
FIG. 13 is a schematic sectional view of a touch screen according to an embodiment of the present disclosure.

For example, FIG. 13 is a schematic section view of a touch screen according to an embodiment of the present disclosure. As illustrated in FIG. 13, the touch screen 20 includes the touch electrode structure 10 in any of the above embodiments and a plurality of leads 111. The touch electrode block 100 included in the touch electrode structure 10 can be connected to the corresponding lead 111 through the via hole structure 112. Each touch electrode block 100 in the touch electrode structure 10 is electrically connected to the corresponding lead 111 for input/output signals. It should be noted that the touch electrode blocks 100 can be arranged in the same layer as the leads 111 and directly connected to each other, and this is not limited herein.

For example, as illustrated in FIG. 13, a substrate 115 is provided with a plurality of leads 111, an insulating layer 113 is provided on the layer where the plurality of leads 111 are located, and a plurality of via hole structures 112 are provided in the insulating layer 113. For example, each of the via hole structures 112 penetrates through the insulating layer 113. The touch electrode structure 10 is arranged on the insulating layer 113, and each touch electrode block 100 in the touch electrode structure 10 is respectively electrically connected to a corresponding lead 111 through a via hole structure 112.

For example, as illustrated in FIG. 13, the touch screen can further include a touch detection chip 116. In the touch screen provided by the embodiment of the present disclosure, each lead 111 is connected to the touch detection chip 116. When a user's finger or stylus touches the self-capacitance touch screen, the capacitance of the finger or stylus will be superimposed on the corresponding touch electrode block, and the touch detection chip 116 can determine the touch position by detecting the change of capacitance value of each touch electrode block 100 during the touch period.

Figure 14:
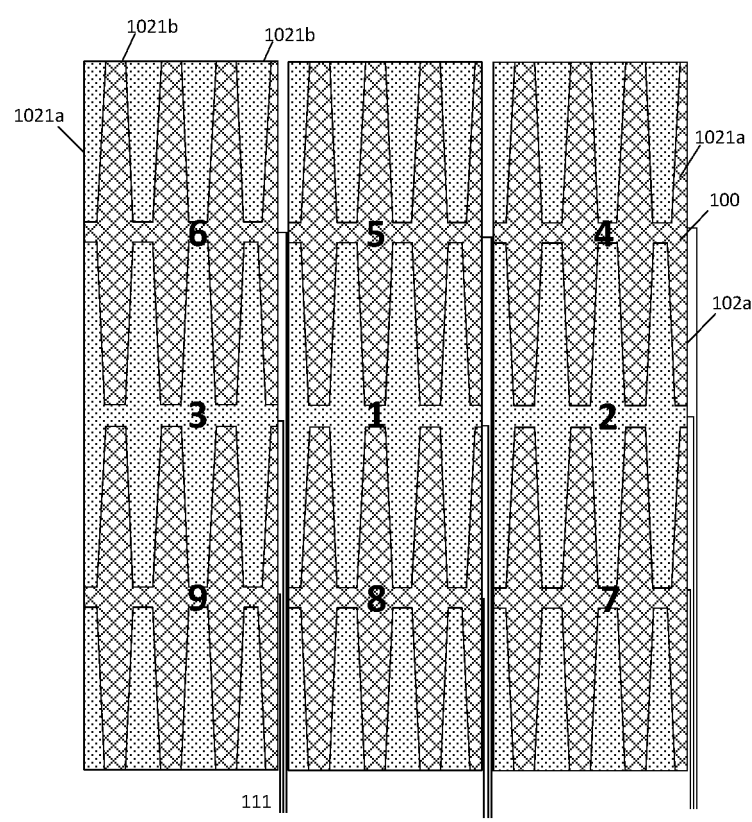
FIG. 14 is a schematic sectional view of another touch screen according to an embodiment of the present disclosure.

For example, FIG. 14 is a schematic plan view of another touch screen according to an embodiment of the present disclosure. As illustrated in FIG. 14, the plurality of leads 111 and the touch electrode blocks 100 are arranged in the same layer, a gap is formed between two adjacent columns of touch electrode blocks 100, and the leads 111 are arranged in the gap. In the same column of touch electrode blocks 100, in the extension direction of the leads 111, the area of the touch electrode blocks 100 can be constant or gradually reduced.

Figure 15:
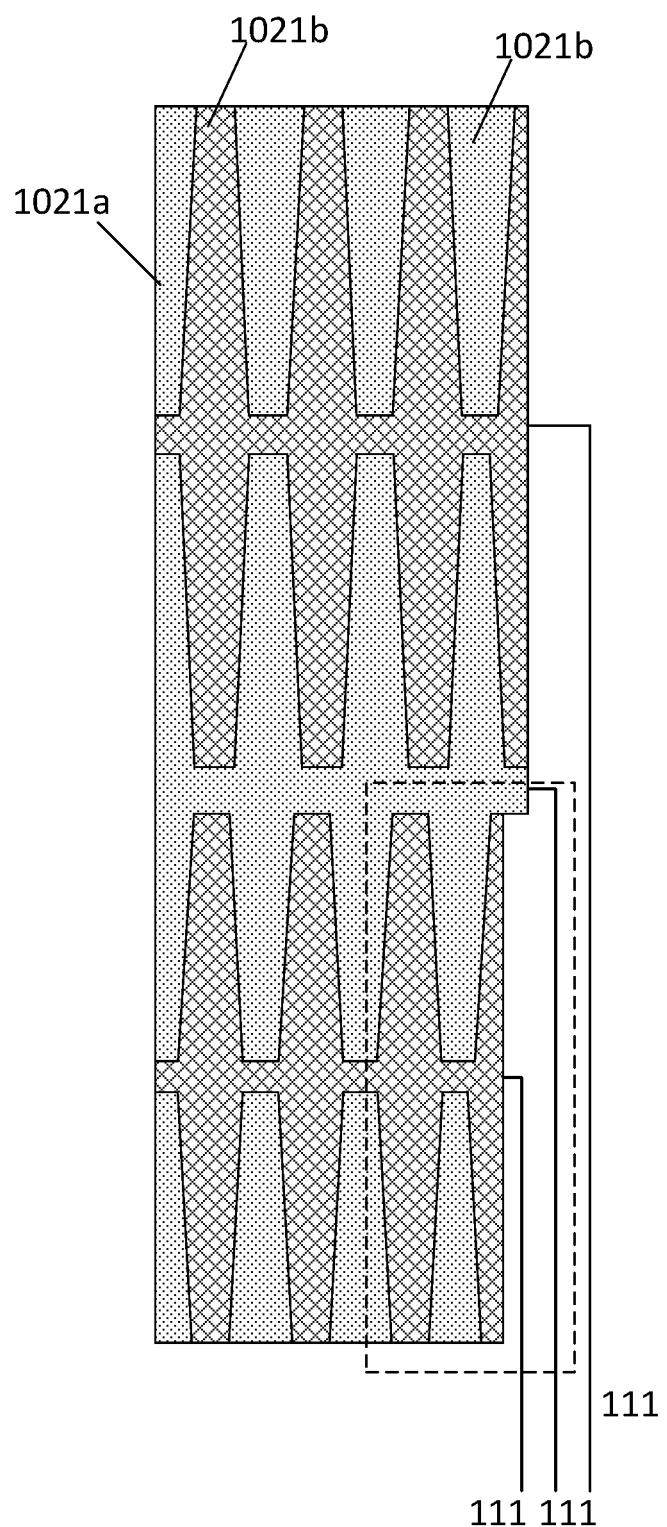
FIG. 15 is a schematic plan view illustrating the connection between a column of touch electrode blocks and leads in the touch screen illustrated in FIG. 14.

For example, FIG. 15 is a schematic plan view illustrating the connection between a column of touch electrode blocks and leads in the touch screen illustrated in FIG. 14. As illustrated in FIG. 15, in the same column of touch electrode blocks 100, in the extension direction of the leads 111, that is, in FIG. 15, in a direction from the contact point of the lead 111 and the touch electrode block 100 to a position of the lead 111 away from the touch electrode block 100, the area of the touch electrode blocks 100 gradually decreases.

Figure 16:
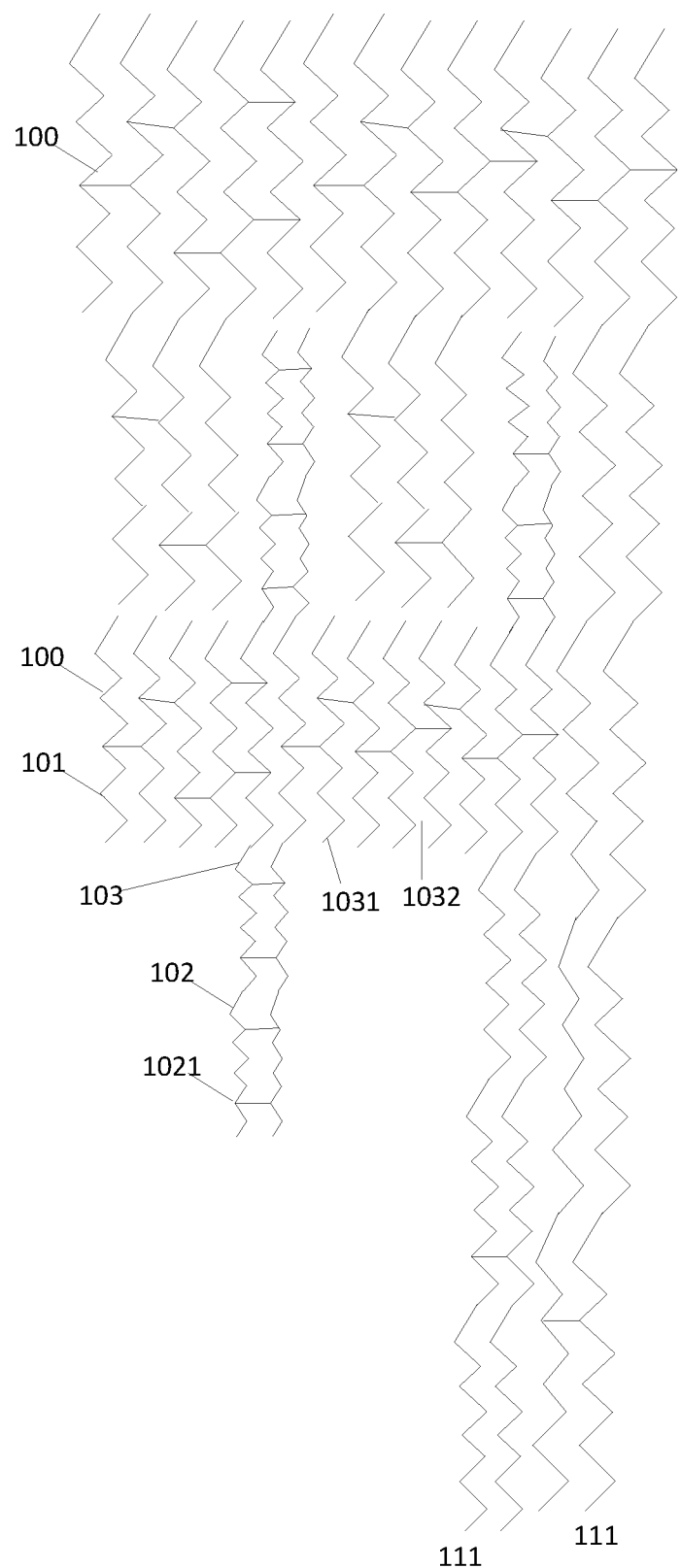
FIG. 16 is a schematic enlarged structural view of the dashed frame region in FIG. 15.

For example, FIG. 16 is a schematic enlarged view of the dashed frame region in FIG. 15. As illustrated, FIG. 16 includes two touch electrode blocks 100, and one side of each touch electrode block is provided with a lead 111. The sawtooth portion 102 includes protrusions 1021 extending along a direction from the main body portion 101 to a position away from the main body portion 101. The main body portion 101 and each of the protrusions 1021 include a grid structure 103, the grid structure 103 includes grid lines 1031 and a hollow region 1032, the grid lines 1031 include sawtooth strips extending along the column direction in which the touch electrode blocks 100 are arranged, and the shape of the sawtooth strips is consistent with the shape of the leads 111. The leads 111 and the touch electrode blocks 100 are arranged in the same layer and formed in the same process step. The lead 111 is arranged on one side of the touch electrode block 100, and the extension length of the lead 111 is longer than the extension length of the sawtooth strips in the grid lines of the touch electrode block 100 connected with the lead 111.

For example, at least one embodiment of the present disclosure further provides a touch display device, which includes the touch electrode structure in any of the above embodiments.

For example, the touch display device further includes a display panel, and the touch electrode structure is arranged on the display panel. The touch display device of this structure is, for example, any one of One Glass Solution (OGS) type touch display device, in-cell (embedded) touch display device or on-cell (external) touch display device.

Figure 17:
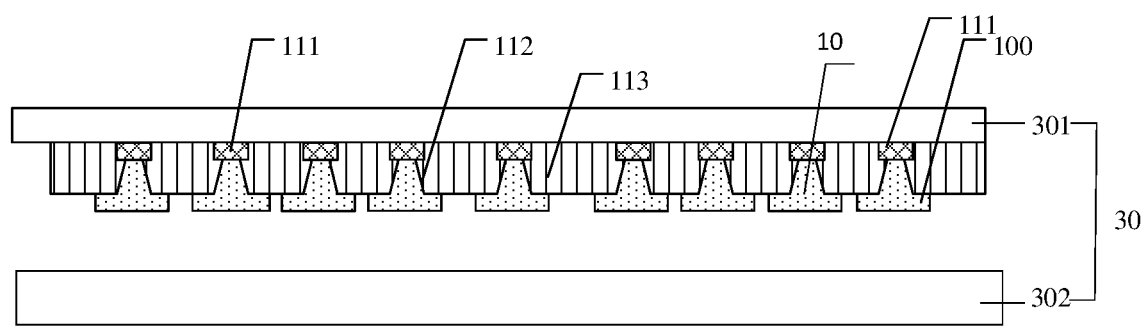
FIG. 17 is a schematic sectional view of an in-cell touch display device according to an embodiment of the present disclosure.

For example, in an in-cell touch display device, each touch electrode structure can be located on the surface of the upper substrate facing the lower substrate or the surface of the lower substrate facing the upper substrate, and the upper substrate and the lower substrate are components of the display panel. For example, FIG. 17 is a schematic section view of an in-cell touch display device according to an embodiment of the present disclosure. As illustrated in FIG.

17, the touch electrode structure 10 is located on the surface of the upper substrate 301 facing the lower substrate 302.

For example, the touch display device includes the touch electrode structure 10 in any of the above embodiments and a plurality of leads 111. The touch electrode block 100 included in the touch electrode structure 10 can be connected to the corresponding lead 111 through the via hole structure 112. Each touch electrode block 100 in the touch electrode structure 10 is electrically connected to the corresponding lead 111 for inputting/outputting signals. The upper substrate 301 is provided with a plurality of leads 111, an insulating layer 113 is provided on the layer where the plurality of leads 111 are located, and the insulating layer 113 is provided with a plurality of via hole structures 112. For example, the via hole structures 112 penetrate through the insulating layer 113. The touch electrode structure 10 is arranged on the insulating layer 113, and each touch electrode block 100 in the touch electrode structure 10 is respectively electrically connected to each corresponding lead 111 through a via hole structure 112.

Figure 18:
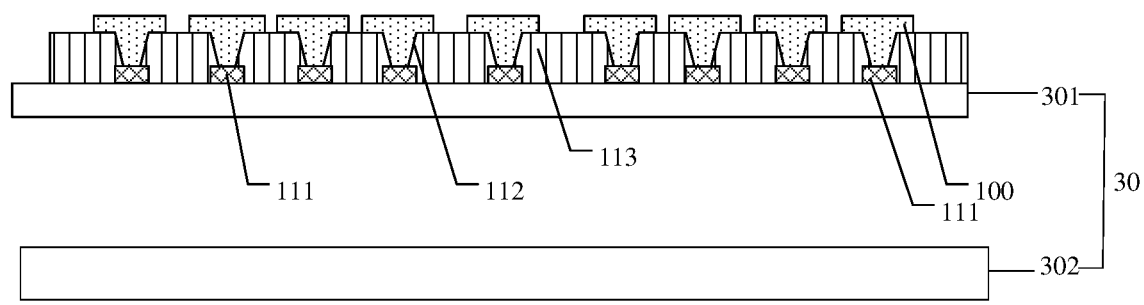
FIG. 18 is a schematic sectional view of an on-cell touch display device according to an embodiment of the present disclosure.

For example, in an on-cell touch display device, each touch electrode structure can be located on one side of the upper substrate away from the lower substrate. For example, FIG. 18 is a schematic section view of an on-cell touch display device according to an embodiment of the present disclosure. As illustrated in FIG. 18, each touch electrode structure 10 is located on one side of the upper substrate away from the lower substrate.

As illustrated in FIG. 18, the display panel 30 includes an upper substrate 301 and a lower substrate 302 which are cell-assembled. The touch display device includes the touch electrode structure 10 according to any embodiments as mentioned above and a plurality of leads 111. The touch electrode block 100 included in the touch electrode structure 10 can be connected to the corresponding lead 111 through the via hole structure 112. Each touch electrode block 100 in the touch electrode structure 10 is electrically connected to the corresponding lead 111 for inputting/outputting signals. The upper substrate 301 is provided with a plurality of leads 111, an insulating layer 113 is provided on the layer the plurality of leads 111 located, and the insulating layer 113 is provided with a plurality of via hole structures 112. For example, the via hole structures 112 penetrate through the insulating layer 113. The touch electrode structure 10 is arranged on the insulating layer 113, and each touch electrode block 100 in the touch electrode structure 10 is respectively electrically connected to each corresponding lead 111 through a via hole structure 112. A passivation layer can also be formed on the upper substrate 301 to cover the touch electrode structure 10, thereby providing protection to the touch electrode structure 10.

For example, a pixel array structure is further provided on the lower substrate 302, and a color film layer, a black matrix, etc. can further be provided on the upper substrate 301, but are not limited thereto. For example, in the display panel, each touch electrode structure can be separately arranged or can be reused as a common electrode in the display panel, which is not limited.

Figure 19:
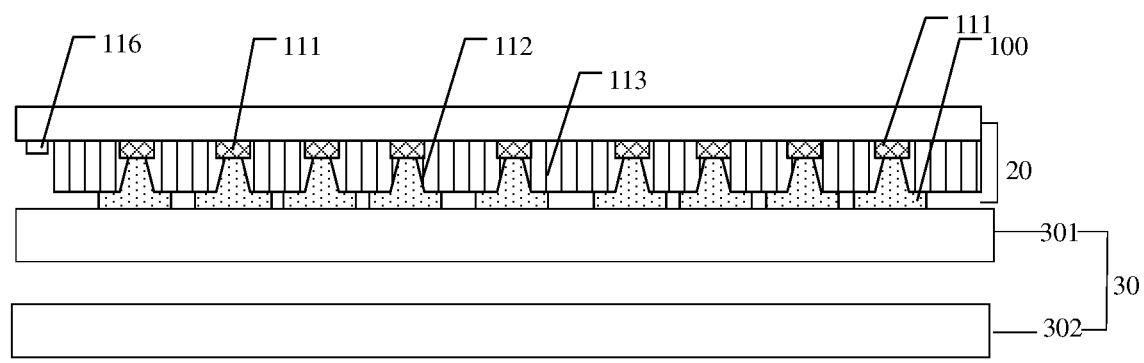
FIG. 19 is a schematic section view of an OGS touch display device according to an embodiment of the present disclosure.

For example, FIG. 19 is a schematic section view of an OGS touch display device according to an embodiment of the present disclosure. As illustrated in FIG. 19, the touch display device further includes a display panel 30 and a touch screen 20 arranged on the display side of the display panel 30, and the touch screen 20 includes the touch electrode structure 10 in any of the above embodiments. For example, the relevant description of the OGS touch display device can be seen in the above-mentioned description of FIG. 13, and will not be repeated here.

For example, the touch display device includes a liquid crystal touch display device or an organic light emitting diode touch display device.

For example, the touch display device can be a display device such as a liquid crystal display, electronic paper, an OLED (organic light emitting diode) display, and any product or component with a display function such as a television, a digital camera, a mobile phone, a watch, a tablet computer, a notebook computer, a navigator and the like including these display devices.

It should be noted that not all the structures of the touch screen, the display panel and the touch display device are given for clarity. In order to realize the necessary functions of the touch screen, the display panel and the touch display device, those skilled in the art can set other structures not illustrated according to specific application scenarios, and the embodiments of the present disclosure are not limited to this. The technical effects of the touch screen, the display panel and the touch display device provided by the embodiments of the present disclosure refer to the technical effects of the touch electrode structures described in the above embodiments, and will not be described here again.

The embodiment of the present disclosure provides a touch electrode structure, a touch screen and a touch display device, which have at least one of the following beneficial effects:

(1) In the touch electrode structure provided by at least one embodiment of the present disclosure, each touch electrode block is designed to have a sawtooth portion, and opposite sawtooth portions in adjacent touch electrode blocks are nested with each other, so that the area proportion of the main body portion of the touch electrode block can be reduced, and during touch operation, the probability that a plurality of sawtooth portions are touched at the same time is greatly improved, so that a plurality of touch electrode blocks including the touched sawtooth portions can generate detection signals, thereby improving touch detection accuracy.

(2) The touch electrode structure provided by at least one embodiment of the present disclosure can avoid the problems of poor touch detection accuracy, poor linearity and poor uniformity of the current touch products.

(3) According to the touch electrode structure provided by at least one embodiment of the present disclosure, when the touch electrode block includes a sawtooth portion, the change of the capacitance values of the touch electrode blocks around the plurality of touch electrode blocks touched by a finger or a stylus is also relatively large, so that accurate coordinate position calculation can be realized.

(4) In the touch electrode structure provided by at least one embodiment of the present disclosure, the size of the touch electrode block including the sawtooth portion can be relatively large, so that the number of touch electrode blocks arranged within the same area size range can be reduced, and the number of bonding pins can also be reduced.

(5) For the touch electrode structure provided in at least one embodiment of the present disclosure, no new process steps will be added to its manufacturing process.

(6) In the touch electrode structure provided by at least one embodiment of the present disclosure, the hollow region included in the main body portion can reduce the area of the main body portion itself, can also reduce the resistance of the main body portion itself, can also reduce the capacitance between the main body portion and subsequently formed pixel electrodes, and can further solve the problem of shadow elimination.

(7) In the touch electrode structure provided by at least one embodiment of the present disclosure, the hollow region in the protrusion included in the sawtooth portion can reduce the area of the protrusion itself, can also reduce the resistance of the protrusion itself, can also reduce the capacitance between the protrusion and the subsequently formed pixel electrodes, and can further solve the problem of shadow elimination.

The following statements should be noted:

(1) The drawings of the embodiments of the present disclosure are only related to structures to which the embodiments of the present disclosure relate, and other structures can refer to general design.

(2) For clarity, in the drawings for describing the embodiments of the present disclosure, a thickness of a layer or a region is amplified or reduced, i.e., those drawings are not drawn according to an actual scale. It should be understood that when an element such as a layer, film, region or substrate is referred to as being "on" or "under" another element, the element may be "directly" "on" or "under" the other element, or intermediate elements may be present.

(3) In case of no conflict, the embodiments of the present disclosure and the characteristics in the embodiments can be combined with each other to obtain new embodiments.

The foregoing embodiments merely are specific embodiments of the present disclosure, but the protection scope of the present disclosure is not limited to this. The protection scope of the present disclosure shall be subject to the scope of protection of the claims.

The invention claimed is:

1. A touch screen, comprising:
a plurality of touch electrode blocks electrically insulated from each other;
a plurality of leads, electrically connected to the plurality of touch electrode blocks, respectively, wherein the plurality of leads and the touch electrode blocks are arranged in the same layer, and the plurality of leads are arranged in a gap between adjacent columns of touch electrode blocks among the plurality of touch electrode blocks,
wherein each of the plurality of touch electrode blocks comprises a main body portion extending along a first direction and a sawtooth portion electrically connected to the main body portion, and the sawtooth portions opposite to each other in adjacent touch electrode blocks are nested with each other,
wherein the main body portion comprises two first edges opposite to each other and two second edges opposite to each other, a length of the first edges is greater than a length of the second edges, both the first edges and the second edges are provided with the sawtooth portion, and the sawtooth portion provided on the first edges is a first sawtooth portion, and the sawtooth portion provided on the second edges is a second sawtooth portion,
wherein the plurality of touch electrode blocks comprise a first touch electrode block and a second touch electrode block that are nested with each other; the second sawtooth portion of the first touch electrode block comprises a plurality of protrusions extending along the first direction, and the first sawtooth portion of the second touch electrode block comprises a plurality of protrusions extending along a second direction, in which one of the plurality of protrusions is disposed on an end of the main body portion of the first touch electrode block, wherein the one of the plurality of protrusions of the second touch electrode block comprises a sub-sawtooth structure having a plurality of sub-protrusions extending along the first direction,
wherein ends of the sub-protrusions of the second touch electrode block are substantially aligned with ends of the plurality of protrusions of the second sawtooth portion of the first touch electrode block in the second direction perpendicular to the first direction.

2. The touch screen according to claim 1, wherein the sawtooth portion comprises a plurality of protrusions extending in a direction from the main body portion to a position away from the main body portion,
the main body portion and each of the plurality of protrusions both comprise a grid structure, and the grid structure comprises grid lines and a hollow region.

3. The touch screen according to claim 2, wherein the grid lines comprise a plurality of sawtooth strips, each of the plurality of sawtooth strips comprises an extension portion and a corner portion, the extension portions of adjacent sawtooth strips are spaced apart from each other, and at least one corner portion of each sawtooth strip is connected to the corner portion of the sawtooth strip adjacent thereto to form the grid lines,
wherein a width of each of the plurality of sawtooth strips is in a range of 7 μm to 80 μm, a distance between two adjacent sawtooth strips is in a range of 6 μm to 20 μm; a distance between adjacent corner portions in a same sawtooth strip is in a range of 100 μm to 400 μm; an inclination angle of the extension portion of each sawtooth strip is in a range of 0 to 40 degrees;
and a width of a line connecting two adjacent sawtooth strips is in a range of 6 μm to 20 μm.

4. The touch screen according to claim 3, wherein, in the sawtooth portion, an extension direction of each of the plurality of sawtooth strips is consistent with an extension direction of each protrusion;
in the main body portion, the extension direction of each of the plurality of sawtooth strips intersects with an extension direction of an outer contour of the main body portion.

5. The touch screen according to claim 1, wherein the main body portion has an outer contour of a rectangle or a parallelogram.

6. The touch screen according to claim 5, wherein the first sawtooth portion comprises a plurality of protrusions, and on the same first edge, adjacent protrusions have an equal distance.

7. The touch screen according to claim 6, wherein the first sawtooth portion comprises one first protrusion or two first protrusions disposed on the same first edge, one of the protrusions on one end of the same first edge is the one first protrusion, or two of the protrusions on two ends of the same first edge are the two first protrusions; one or more protrusions on the same first edge except for the one or two first protrusions are one or more second protrusions, and an area of each first protrusion is less than an area of each second protrusion.

8. The touch screen according to claim 7, wherein an extension length of the first protrusion from the first edge and an extension length of the second protrusion from the same first edge are equal, and a width of the first protrusion in an extension direction of the first edge is half of a width of the second protrusion in the extension direction of the same first edge.

9. The touch screen according to claim 8, wherein a shape of the second protrusion is approximately an isosceles triangle, an isosceles trapezoid or a rectangle.

10. The touch screen according to claim 7, wherein the plurality of touch electrode blocks have the same shape, and each of the plurality of touch electrode blocks comprises one first protrusion on one end of the same first edge.

11. The touch screen according to claim 1, wherein the plurality of protrusions of the second sawtooth portion of the first touch electrode block are disposed on the same second edge, adjacent protrusions have an equal distance.

12. The touch screen according to claim 11, wherein the second sawtooth portion comprises one third protrusion or two third protrusions disposed on the same second edge, one of the protrusions on one end of the same second edge is the one third protrusion, or two of the protrusions on two ends of the same second edge are the two third protrusions; one or more protrusions on the same second edge except the one or two third protrusions are one or more fourth protrusions, and an area of each third protrusion is half of an area of each fourth protrusion.

13. The touch screen according to claim 12, wherein an extension length of the third protrusion from the second edge and an extension length of the fourth protrusion from the same second edge are equal, and a width of the third protrusion in an extension direction of the second edge is half of a width of the fourth protrusion in the extension direction of the same second edge.

14. The touch screen according to claim 1, wherein the first touch electrode block has a first main body portion and a first sawtooth portion, and the second touch electrode block has a second main body portion and a second sawtooth portion, each of the first main body portion and the second main body portion has a first side surface and a second side surface opposite to each other in the first direction, wherein the first side surfaces of the first main body portion and the second main body portion and a third side surface of one of the first sawtooth portion and the second sawtooth portion are aligned in the second direction perpendicular to the first direction, and the second side surfaces of the first main body portion and the second main body portion and a fourth side surface of one of the first sawtooth portion and the second sawtooth portion are also aligned in the second direction perpendicular to the first direction.

15. The touch screen according to claim 1, wherein the leads and the touch electrode blocks are electrically connected in one-to-one correspondence.

16. The touch screen according to claim 1, wherein each of the plurality of touch electrode blocks has an outer contour with a substantially axisymmetric shape.

17. The touch screen according to claim 15, wherein, upon the sawtooth portion comprising a protrusion extending in a direction from the main body portion to a position away from the main body portion, the main body portion and the protrusion both comprise a grid structure, the grid structure comprises grid lines and a hollow region, and the grid lines comprise a plurality of sawtooth strips extending in a column direction in which the touch electrode blocks are arranged, the plurality of sawtooth strips and the leads have consistent shapes.

18. A touch display device, comprising the touch electrode structure according to claim 1.

* * * * *